No. 857,134. PATENTED JUNE 18, 1907.
E. A. WILCOX.
GASKET.
APPLICATION FILED APR. 23, 1906.

Witnesses:
Wm. Geiger
Pearl Abrams.

Inventor:
Elmer A. Wilcox
By Munday Evarts & Adcock
Attorneys

UNITED STATES PATENT OFFICE.

ELMER A. WILCOX, OF CHICAGO, ILLINOIS.

GASKET.

No. 857,134.  Specification of Letters Patent.  Patented June 18, 1907.

Application filed April 23, 1906. Serial No. 313,268.

*To all whom it may concern:*

Be it known that I, ELMER A. WILCOX, a citizen of the United States, residing in Chicago, in the county of Cook and State of Illinois, have invented a new and useful Improvement in Gaskets, of which the following is a specification.

In my application for patent, Serial No. 288,158, filed November 28, 1905, since patented in Patent No. 836,950, dated Nov. 27, 1906, I show and describe a flat packing ring or gasket for the joints of pipes made from soft sheet metal bent or spun so as to form between the folds of the metal an annular interior channel or passage. This channel communicates with the interior of the pipe, thus admitting the steam or other fluid therefrom, and enabling the fluid to act expansively on the walls of the channel and to maintain the tightness of the joint.

My present invention is a carrying forward of this idea of utilizing the steam or other pressure existing in the pipe as a means of expanding the gasket, and it consists of a gasket or packing ring made of soft metal and bent into U form in cross section placed between the opposing flanges of the parts united by the joint and compressed thereby, the space between the folds of the rim being filled with an elastic packing, which may be either rubber, paper, fibrous material or other suitable substance, the open side of the ring being presented to the steam or fluid in the pipe so that the pressure will be exerted upon the filling material and act through said filling material to expand the metal ring and keep its sides in close contact with the parts of the joint.

Figure 1:
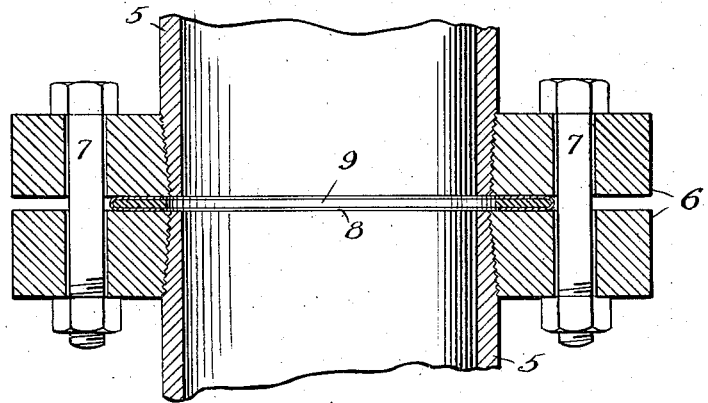
Figure 2:
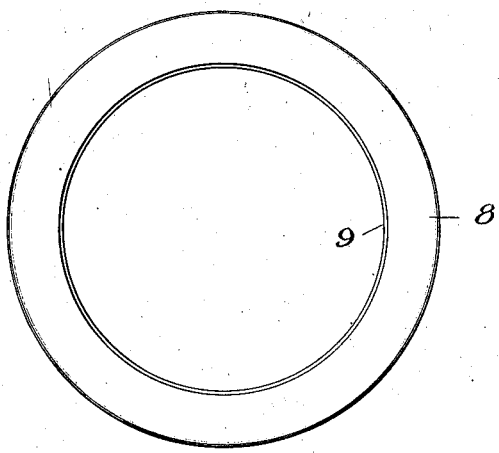
Figure 3:
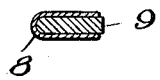

The nature of my invention is fully set forth below, and is also illustrated in the accompanying drawing, in which latter Figure 1 is a section of a joint provided with my improved packing. Fig. 2 is a plan view of the gasket, and Fig. 3 is a transverse section of the same.

In said drawing, 5, 5 represent united sections of a pipe, each being provided with a flange 6, 6 through which the bolts 7, 7 may be passed. The gasket is shown at 8, and is arranged between said flanges and compressed thereby and consists of an endless ring of flat copper doubled so that it is U form in cross section, the open side of the ring being upon its interior, and a filling 9 inserted in the U-shaped ring at the open side and substantially filling the space between the walls of the ring, and acting to prevent the total collapse of the ring under the pressure put upon it by the bolts 7 and which would deprive the ring of its elasticity. The compression on the ring insures conformity by it to the roughnesses or other imperfections of the opposing faces of the joint, and prevents leaking of the steam between the outside of the ring and the faces by closing the avenues of escape which would otherwise be found there. The compression is also felt by the filling. This filling material should be of an elastic nature, and it preferably extends inward beyond the edges of the metal ring, as shown, so that the inner edges of the metal will not become bent in any manner apt to close the open side of the ring. With this construction, the expansive force of the steam or other fluid in the pipe presses against the filling and forces it into the ring and causes it to expand the latter, the internal pressure from the pipe reinforcing the natural elasticity of the filling, and as the pipe cools and the internal pressure is withdrawn the filling will still continue to exert its expansive force sufficiently to maintain close contact between the ring and the opposing faces.

While I have shown the invention as applied to a pipe joint, it will be understood it may be used in other steam or fluid joints, having opposing faces adapted to compress the ring in a manner similar to that shown.

I claim:—

1. The combination with the parts of a steam or similar joint, having opposing faces or flanges as shown, of an endless ring inserted between the faces or flanges and compressed thereby, such ring being made of soft metal and U shape in cross section, with the open side or edge toward the axis of the joint, and the space within the ring being filled with an elastic filling.

2. The combination with the parts of a steam or similar joint, having opposing faces or flanges as shown, of an endless ring inserted between the faces or flanges and compressed thereby, such ring being made of soft
5 metal and U shape in cross section, with the open side or edge toward the axis of the joint, and the space within the ring being filled with an elastic filling projecting toward the axis beyond the inner edges of the ring.

ELMER A. WILCOX.

Witnesses:
H. M. MUNDAY,
EDW. S. EVARTS.